UNITED STATES PATENT OFFICE.

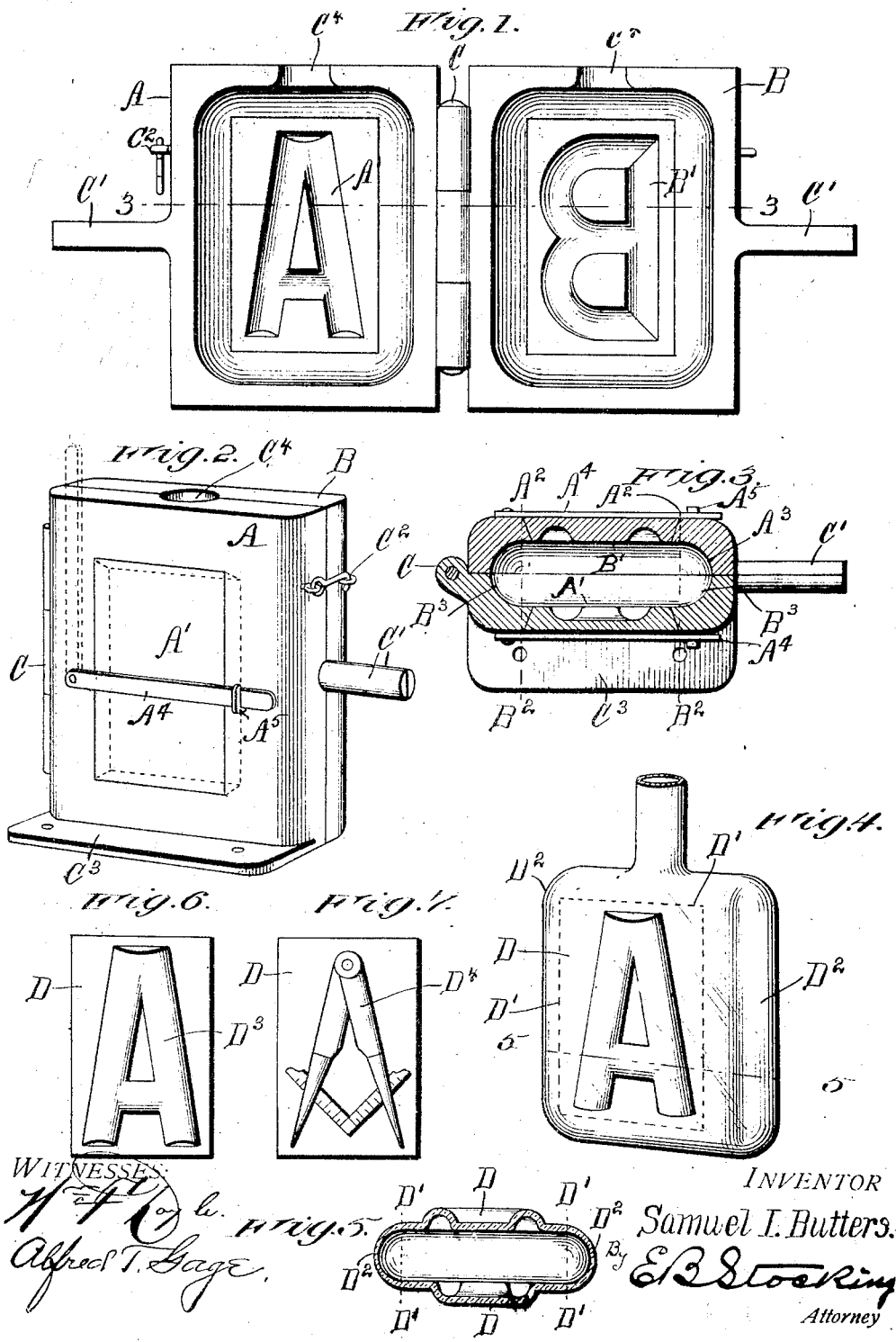

SAMUEL I. BUTTERS, OF CLARKSBURG, WEST VIRGINIA.

MOLD FOR BLOWN-GLASS PLATES.

No. 839,987.　　　　Specification of Letters Patent.　　　　Patented Jan. 1, 1907.

Application filed January 28, 1905. Serial No. 243,119.

*To all whom it may concern:*

Be it known that I, SAMUEL I. BUTTERS, a citizen of the United States, residing at Clarksburg, in the county of Harrison, State of West Virginia, have invented certain new and useful Improvements in Molds for Blown-Glass Plates, of which the following is a specification, reference being had therein to the accompanying drawings.

This invention relates to a mold for glass blown plates having thereon embossed letters or designs, and is particularly adapted for the construction of such a plate of large size.

In the prior art it has been customary to form small letters embossed upon glass plates by blowing the same upon the angular faces of a receptacle or bottle, and it has been found that at the angles between these faces the thickness of the plate was materially decreased, so that a thin brittle edge was left at that point, while a mold of this character could not be used in blowing a large letter, owing to the area of expansion necessary to form a plate of the size common in signs and other large designs produced in plates of transparent or translucent character. These large plates have been heretofore formed by molding or pressing the glass so that the same was of material thickness and the design simply raised upon the surface thereof, by an additional thickness of material, thus producing a plate which was easily broken or fractured, owing to its compressed character, and which was very objectionable, owing to the weight thereof for the necessary size, of letter.

The present invention has for an object to obviate these difficulties by the provision of a mold for the formation of a plate of equal thickness throughout its length and of a blown character in which the design or letter upon the plate is of the same thickness as the body of the plate and embossed thereon. The formation of the plate as part of a flat-sided blown bowl permits the plate to be tempered in that form, which prevents the warping of the plate which occurs in an attempt to temper a large plate when in sheet form.

Other and further objects and advantages of the invention will be hereinafter set forth and the novel features thereof defined by the appended claim.

In the drawings, Figure 1 is an elevation of the mold opened; Fig. 2, a perspective of the same closed; Fig. 3, a section on the line 3 3 of Fig. 1 with the mold closed; Fig. 4, a perspective of the connected plates as removed from the mold; Fig. 5, a horizontal section on the line 5 5 of Fig. 4; Fig. 6, an elevation of a plate having a letter thereon, and Fig. 7 a similar view of a design-plate.

Like letters of reference refer to like parts in the several figures of the drawings.

Any desired construction of mold may be used for the purpose of this invention, provided the same has a flat face extended beyond the area of the die-face therein and merged into a curved portion. For instance, as illustrated, the mold may comprise opposite members A and B, both of which may contain letters or designs to be formed upon the opposite plates, or, if desired, one of these may be omitted and a plane wall used in its stead. The mold as here shown is provided with a hinge member C and handles C', while it is held in closed position by any form of latch, (shown at C²,) one member of the mold being fixed to a support by the plate C³, so that the opposite member is free to swing toward and from the same in the usual manner. Each of the molds is provided with a die-face containing the design therein, as shown at A' and B', and beyond this face with a flat molding face or surface extending between the points A² upon one face of the mold and the points B² upon the opposite face thereof, this flat portion being of greater area than the die-face or the letter to be formed thereon and at each end is merged into a curved portion A³ and B³, which portions meet at the point of separation of the mold, thus permitting its opening by a swinging movement for the removal of the blown piece therefrom. Each member of the top of the mold is provided with the usual opening C⁴ for the introduction of the blowpipe therein. The piece of bowl blown within this mold is shown at Fig. 4 and comprises the opposite flat faces D of greater area than the plate to be formed and from which the plate containing the letter or design is cut upon the dotted lines D', (indicated in Fig. 4,) leaving the completed plate as shown in Fig. 6. When thus blown, the opposite plates are connected at their edges by the curved portions D², which are thinner in diameter than the body of the plates, but owing to their curved configuration prevent the breakage or bursting of the piece in blowing, which frequently occurs in the use of an angular mold. Either one or both plates comprising the piece may be used to contain a letter or design and while in connected form are passed to the tempering or annealing furnace, so that they may be held against warping and when severed from each other upon the lines D' of Figs. 4 and 5 produce a true plate of even thickness adapted to be inserted in a groove or slot, as is customary in the use of letters for sign purposes. While in Fig. 6 a letter D³ has been shown upon the plate D, any desired design or body may be represented thereon—for instance, a Masonic emblem—as shown at D⁴ in Fig. 7.

For the purpose of permitting an interchanging of the letters or characters to be blown in a single mold the members A and B are each provided with an aperture having beveled edges for the insertion of the die-faces A' and B', which are also beveled upon their edges and adapted to fit those of the apertures, as shown in Figs. 2 and 3. The die-faces are preferably inserted from the outside and are held in position by any desired means—for instance, a pivoted latch-bar A⁴ and latch-plate A⁵. This bar when thrown into the dotted position in Fig. 2 permits the removal of a die-face and its replacement by one provided with a different character, which is then locked in position by dropping the bar.

It will be seen that the present mold having only two flat surfaces permits the formation of a plate of the necessary size for sign purposes or for application to a window-sash by means of a blowing process and the tempering of the blown plate thus securing a plate of thin tough character in which the parts are of equal thickness and not, consequently, liable to fracture and from which the letter or design is blown without increasing the thickness of the plate, thus reducing the weight of material and increasing its transparency, if it be desired for that purpose, and, above all, providing a letter-plate which may be annealed without warping and can be formed by a blowing process, which has been impossible in the prior art. It should be stated that these plates are not for the formation of letters to be severed therefrom for sign purposes; but the plate is of materially large size, such as used in large illuminated signs, in which it is essential that a light, strong, and durable plate containing the letter or design must be provided to meet the climatic and other conditions to which such a sign is exposed.

It will be obvious that changes may be made in the details of construction and configuration without departing from the spirit of the invention as defined by the appended claim.

Having described my invention and set forth its merits, what I claim, and desire to secure by Letters Patent, is—

A mold for the production of glass-sign letter-plates comprising an unobstructed flat molding-face of larger area than the character to be produced therein, a die disposed beyond the plane of said molding-face and within the margin thereof, and continuously-curved marginal portions extending entirely about and merging into all the edges of said flat molding-face, whereby an obstructed flow and even thickness of molten glass upon said molding-face is secured and the character thereon disposed within the flat margin portion of the finished plate.

In testimony whereof I affix my signature in presence of two witnesses.

SAMUEL I. BUTTERS.

Witnesses:
 CHAS. W. FURBEE.
 E. THAD POST.